N. M. SOMMERVILLE.
DETACHABLE GEARING FOR MOWERS.
APPLICATION FILED MAY 10, 1916.

1,298,110.

Patented Mar. 25, 1919.
2 SHEETS—SHEET 1.

WITNESSES
Chas. E. Kemper
J. Reavy Kelly

INVENTOR
Newton M. Sommerville.

BY Richard B. Owen

ATTORNEY

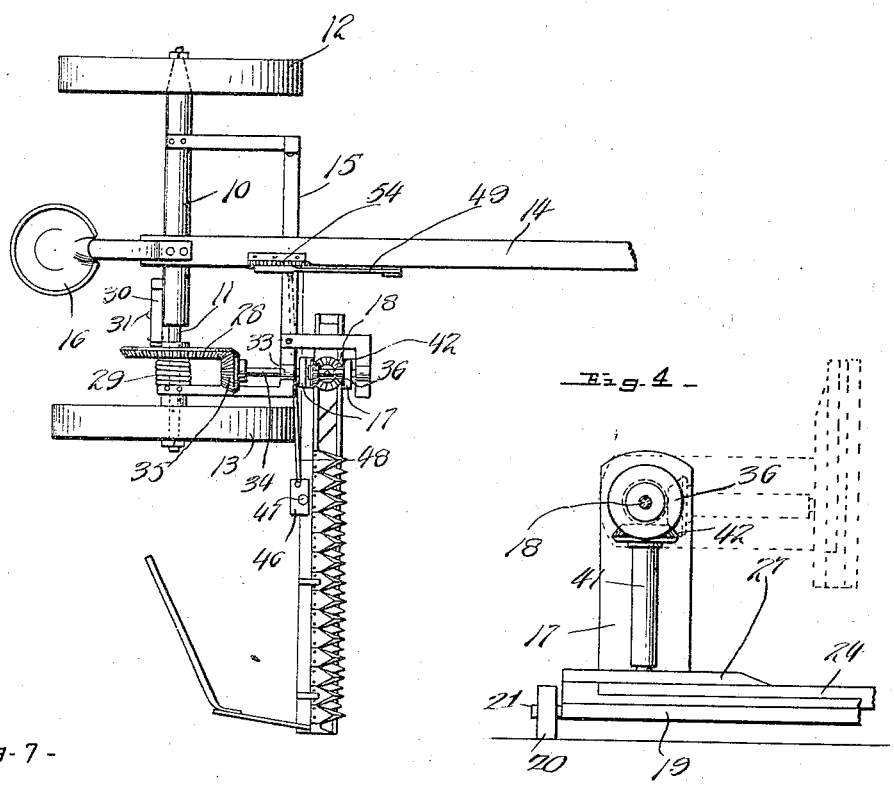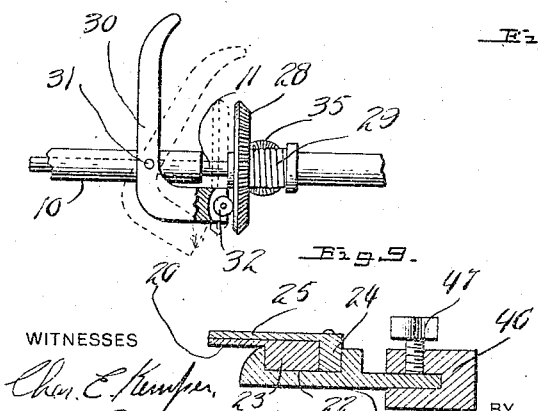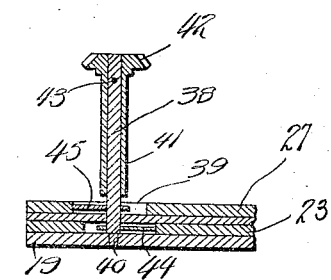

UNITED STATES PATENT OFFICE.

NEWTON M. SOMMERVILLE, OF EMERICK, NEBRASKA.

DETACHABLE GEARING FOR MOWERS.

1,298,110.     Specification of Letters Patent.     Patented Mar. 25, 1919.

Application filed May 10, 1916. Serial No. 96,689.

*To all whom it may concern:*

Be it known that I, NEWTON M. SOMMERVILLE, a citizen of the United States, residing at Emerick, in the county of Madison and State of Nebraska, have invented certain new and useful Improvements in Detachable Gearing for Mowers, of which the following is a specification.

My present invention has relation to certain new and useful improvements in mowing machines and as its primary object it contemplates the provision of a novel device of this nature that is readily susceptible of use in the capacity of a hedge trimmer and which may be converted from one to the other quickly and easily without any material exertion on the part of the operator.

A further object of my invention is to provide a device of the type in question that is extremely simple in construction, strong and durable and highly practical from both the standpoint of the manufacturer and the standpoint of the user; and which, it is believed may be manufactured at a comparatively low cost.

Various other objects and advantages will become apparent during the continuance of the following description.

These objects are accomplished by such means as are shown in their preferred embodiment in the accompanying drawings, described in the following specification and then more specifically pointed out in the appended claims.

In the accompanying drawings wherein like characters designate like parts throughout the several views:—

Fig. 3 is a view in top plan of my improved mowing machine.

Fig. 4 is a view in detail, showing in dotted line one position to which the cutter bar is adjustable.

Fig. 7 is a view in detail of an improved clutch that is used for the purpose of establishing a direct connection between the live axle of the machine and the means for operating the sickle bars.

Fig. 8 is a view in longitudinal section of the drive shaft for the sickle bars showing the means for mounting the same in connection with the machine.

Fig. 9 is a view in section of the cutter bar showing the method of mounting the sickle bars in relation thereto.

Figure 1:
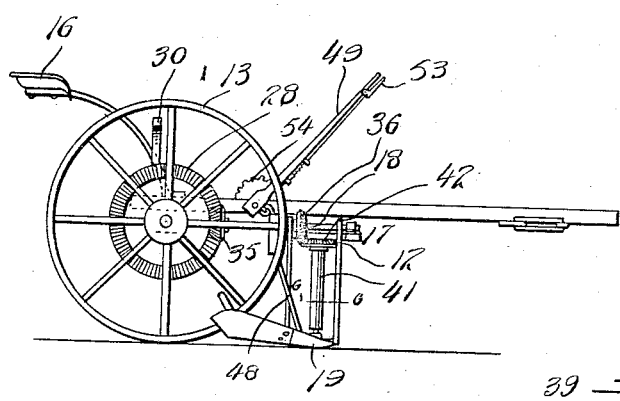
Figure 1 is a view in side elevation of my improved mowing machine showing the same as in its preferred embodiment.

In reducing my invention to practice, I first provide a supporting axle which, in the present embodiment includes a stationary and a movable section, 10 and 11 respectively. Supporting wheels are arranged to carry this axle structure, such as designated at 12 and 13 respectively, the wheel 12 being arranged to be movable independently of the stationary axle section 10 while the wheel 13, serving in the capacity of a traction wheel is fixed to the movable axle section 11.

A tongue 14 that is of the substantially conventional form may be fixed to the stationary section 10 of the axle in a suitable manner, while it may be further connected through the instrumentality of a transverse supporting yoke 15. An operator's seat 16 may also be associated with the tongue 14 or any other desired supporting structure of the device whereby the operator may be in a position to control the operating mechanism of the device at all times.

Carrying arms 17 are movably mounted on a shaft 18 and are rigidly connected with the cutter bar 19; the cutter bar extending therefrom at a substantially right angle as shown in Fig. 4. In order to support both the cutter bar and the arms 17 when they are in the position shown in Fig. 1, I may employ a suitable supporting wheel 20 that may be carried on a stud 21 of the arm 17 on the cutter bar, as shown.

The cutter bar 19 is cut out or grooved longitudinally as at 22 to slidably receive independent sickle bars or blades 23 and 24 respectively, (see Fig. 9), the cutting teeth 25 of the sickle bar 24 overlying the cutter teeth 26 of the other sickle bar, whereby during opposite reciprocatory movement of the cutter bars, the teeth 25 and 26 will efficiently perform the function ascribed thereto. Adjacent its inner end, the sickle bar 24 is enlarged or thickened to form an apertured element as at 27 which overlies the contiguous portion of the remaining sickle bar. By reason of the movable connection between the arms 17 and the shaft 18, it will be recognized that the cutter bar 19 may be raised into the position shown in dotted lines in Fig. 4 or other adjusted positions whereby it may be advantageously used as the hedge trimmer.

With a view of providing means to positively drive the sickle bars and impart opposite reciprocatory movement thereto, I first provide the movable axle section 11 with a driving gear 28, that is preferably splined thereon in the usual manner and which is normally held under tension of an expansion spring 29. A substantially L-shaped keeper member 30 is pivotally mounted on the stationary section 10 of the axle as at 31, the one end thereof carrying a friction wheel 32 to bear against the outer face of the driving gear 28 as shown in full lines in Fig. 7 thereby retaining the same against the tension of the coil spring 29. However the operator may, by actuating the keeper 30, move the same into the position shown in dotted lines in Fig. 7, whereby the gear wheel 28 will be moved under tension of the coil spring 29 to the position shown in dotted lines in that figure.

I further provide the supporting yoke 15 with a bearing 33 which revolubly supports a counter shaft 34 of the shaft 18, the latter carrying intermediate its ends the pinion 35 which is designed to co-mesh at certain times with the driving gear 28 above referred to. Intermediate its ends the counter-shaft 34 carries a beveled pinion 36 which has fixed connection therewith designed to co-mesh with a certain gear wheel that will be subsequently described.

Figure 6:
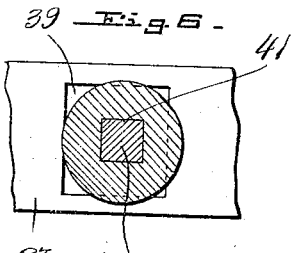
Fig. 6 is a sectional view taken on line 6—6 of Fig. 1.
Figure 2:
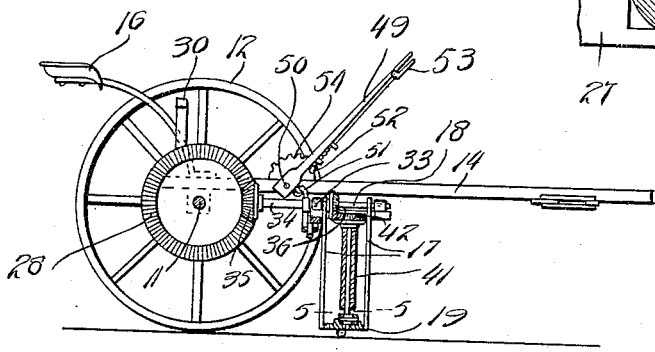
Fig. 2 is a view in longitudinal section showing more clearly the operating means for the sickle bars.
Figure 5:
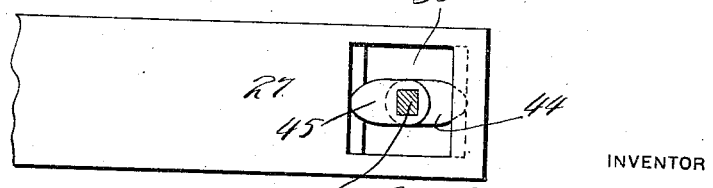
Fig. 5 is a sectional view taken on line 5—5 of Fig. 2, showing the method of imparting a reciprocatory movement to the sickle bars.

Another shaft 38 has its lower portion passed through suitable cutouts 39 of the sickle bars (see Fig. 8), its lower reduced end 40 being journaled in the cutter bar 19 as clearly shown. This is square when viewed in cross section (as shown in Fig. 6), and receives a sleeve 41 having a similarly formed aperture, the latter in turn being provided with a beveled gear 42 to co-mesh with the beveled gear 36 above referred to. Any suitable means may be employed to adjustably support the sleeve 41 and the respective gear wheels on the shaft 38. In the drawings I have shown a pin 43 passed through suitable apertures in the sleeve and shaft thereby accomplishing this method.

At a suitable point, the shaft 38 is provided with oppositely projecting cam members 44 and 45 respectively that are designed to operate in the cutouts 39 of the sickle bars whereby during rotation of the shaft the sickle bars will be given operative reciprocatory movement. Upon movement of the device, the turning of the traction wheel will of course impart a like movement to the movable axle section 11 thus causing rotation of the driving gear 28 and the consequent rotation of the shaft 38 through the instrumentality of the pinions 35 and 36 and the counter-shaft 34. Thus a desired reciprocatory movement of the sickle bars will be obtained to cause the desired cutting of the grass or hedge, whichever the case may be.

Means are also provided to raise and lower the cutter bar into the position shown in Fig. 4. During this movement of the cutter bar, the pinion 42 will move to the position shown in dotted lines in Fig. 6, while the pinion 36 will remain in co-meshing engagement therewith so that the sickle bars will be actuated irrespective of the angle of the cutter bar or the arm 17. Consequently when in the position shown in dotted lines or any other adjusted position, the sickle bars may be used for the purpose of trimming a hedge or the like.

As a means of raising and lowering the cutter bar as above referred to, in the present embodiment I have shown a block 46 to be adjustably mounted on the cutter bar as at 47, while a cable 48 has connection with the block 46. An actuating lever 49 is pivotally mounted on the tongue 14 as at 50, the latter having connection with cable 48 above referred to as at 51. The operating lever 49 is in turn provided with a slidably mounted pawl 52 that may be controlled by a hand lever 53, and which is designed to engage with a segmental rack 54 at certain times, whereby the operating lever may be held in certain adjusted positions. It will of course be understood that the cable 48 will be led around pulleys or friction wheels properly placed to give the desired drawing tension thereon.

From the foregoing it will be noted that I have provided a device that is primarily designed to be used as a mower but which may be readily converted into a device for trimming hedges and the like, without any material exertion on the part of the operator. It is also apparent that during the adjustment of the cutter blade and the respective sickle bars, the operation of the latter is not in any way impeded and the actuation thereof is assured at all times.

In view of the fact that the advantages and novel features of my invention appear to be apparent from the foregoing further detail description is deemed unnecessary.

In reducing my invention to practice I find that the form referred to herein as the most practical and is perhaps the preferred embodiment, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claims.

I claim:—

1. In a device of the class described the combination with a frame, a stationary axle, a rotating axle, a wheel loosely mounted upon said stationary axle, a wheel secured to said rotating axle and adapted to rotate the same, a slidable gear mounted upon said rotating axle, a spring for normally urging said slidable gear to an inoperative position, a mowing device, a driving shaft therefor, a pinion carried by said shaft, and a lever for engaging the rear face of said slidable gear and urging the same to a meshing engagement with said pinion for driving said mowing device.

2. In a device of the class described the combination with a frame, of a stationary axle carried thereby, a rotating axle mounted within said stationary axle, a wheel loosely mounted upon said stationary axle, a wheel secured to said rotating axle, a sliding gear mounted upon said rotating axle, a spring engaging said sliding gear and normally urging the same to an inoperative position, a mowing device, a shaft for operating said mowing device, a pinion carried by said shaft and adapted to mesh with said sliding gear, a keeper lever pivotally mounted upon said stationary axle, said keeper lever provided with a laterally extending end, and a roller carried by the outer end of said laterally extending end and engaging said slidable gear for throwing said slidable gear into an operative position as said keeper lever is swung.

In testimony whereof I affix my signature in presence of two witnesses.

NEWTON M. SOMMERVILLE.

Witnesses:
H. E. MASON,
A. A. HORRACKS.

Copies of this patent may be obtained for five cents each, by addressing the "Commissioner of Patents, Washington, D. C."